United States Patent [19]
Pinke et al.

[11] 3,968,079
[45] July 6, 1976

[54] RUBBER COMPOSITIONS STABILIZED WITH HETEROCYCLIC NITROGENOUS ANTIOXIDANTS

[75] Inventors: Paul A. Pinke, Des Plaines; Stephen N. Massie, Palatine, both of Ill.

[73] Assignee: Universal Oil Products Company, Des Plaines, Ill.

[22] Filed: Dec. 26, 1974

[21] Appl. No.: 536,492

[52] U.S. Cl. ............................ 260/45.8 R; 260/800
[51] Int. Cl.² ............................................ C08K 5/34
[58] Field of Search ...................... 260/45.8 N, 800

[56] References Cited
UNITED STATES PATENTS

| | | |
|---|---|---|
| 1,899,058 | 2/1933 | Reed .................................. 260/800 |
| 2,041,854 | 5/1936 | Neal .................................. 260/800 |
| 3,480,635 | 11/1969 | Altwicker ...................... 260/45.8 N |
| 3,557,054 | 1/1971 | Kibler .............................. 260/45.8 N |
| 3,586,655 | 6/1971 | Forhat ............................ 260/45.8 N |
| 3,595,973 | 7/1971 | Kibler .............................. 260/45.8 N |

*Primary Examiner*—V.P. Hoke
*Attorney, Agent, or Firm*—James R. Hoatson, Jr.; Raymond H. Nelson; William H. Page, II

[57] ABSTRACT

A novel antioxidant utilized in a rubber-substrate comprising a mono- or di(heterocyclic nitrogen)-substituted diarylalkane is disclosed.

10 Claims, No Drawings

RUBBER COMPOSITIONS STABILIZED WITH HETEROCYCLIC NITROGENOUS ANTIOXIDANTS

This invention relates to a mono- or di(heterocyclic nitrogen)-substituted diarylalkane. More specifically, this invention relates to a rubber substrate containing as an antioxidant an effective amount of mono- or di(heterocyclic nitrogen)-substituted diarylalkane.

It is well known in the prior art that various nitrogen-containing compounds may be utilized to prevent oxidation. It is also well known in the prior art that antioxidants may be added to rubber substrates such as tires to prevent the cracking of the rubber and a premature deterioration of the material. The most common nitrogen antioxidants utilized in rubber substrates known to the art are probably various diamines as exemplified by the following Structure I

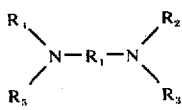

STRUCTURE I wherein $R_1$ is phenyl(phenylenediamine) and $R_2$, $R_3$, $R_4$ or $R_5$ may be hydrogen, lower alkyl, aryl, lower cycloalkyl, substituted aryl or substituted cycloalkyl.

In contradistinction to the prior art it has now been discovered that mono- or di(heterocyclic nitrogen)-substituted diarylalkanes may be added to rubber substrates, said diarylalkanes functioning as antioxidants. The utilization of the mono- or di(heterocyclic nitrogen)-substituted diarylalkanes as antioxidants will result in the benefit to the rubber substrate as a consequence of alleviating cracking and deterioration problems of the substrate. The mono- or di(heterocyclic nitrogen)-substituted diarylalkanes will prevent the cracking of the rubber substrate due to the oxidation of compounds found therein and alleviate any storage problems by the necessary impregnation of the rubber substrate with the antioxidant. A specific utility of the mono- or di(heterocyclic nitrogen)-substituted diarylalkanes is the use of an effective amount of 4,4'-bis-(N-pyrrolidinyl)-di-phenylmethane to prevent the cracking and deterioration of natural rubber.

It is therefore an object of this invention to provide an antioxidant for a rubber substrate.

A further object of this invention is to provide an antioxidant for a rubber substrate which will possess great antioxidant capabilities and therefore be less expensive on a cost-performance basis.

In one aspect an embodiment of this invention resides in a rubber substrate containing, as an antioxidant therefor, an effective amount of mono- or di(heterocyclic nitrogen)-substituted diarylalkanes.

A specific embodiment of this invention resides in the utilization of an effective amount of 4,4'-bis-(N-pyrrolidinyl)-diphenylmethane in a natural rubber substrate to prevent cracking and deterioration.

A second specific embodiment of invention resides in the utilization of an effective amount of 4-amino-4-(N-pyrrolidinyl)-diphenylmethane in a synthetic rubber substrate to prevent cracking and deterioration.

Other objects and embodiments will be found in the following further detailed description of the present invention.

As hereinbefore set forth the present invention is concerned with a rubber substrate containing, as an antioxidant therefor, an effective amount of a mono- or di(heterocyclic nitrogen)-substituted diarylalkane. The effective amount of the mono- or di(heterocyclic nitrogen)-substituted diarylalkane will range from about 2 parts per million to about 300 parts per million depending on the type of rubber substrate and the type of antioxidant utilized to prevent cracking and deterioration. It is also contemplated within the scope of this invention that the mono- or di(heterocyclic nitrogen)-substituted diarylalkanes be present in an excess of 300 parts per million, although economic consideration used may make an excess consideration impractical. A novel antioxidant may be charged to the rubber substrate as a coating, an impregnation or the various types of mixture impregnation which may be performed at the formation of the rubber products.

Examples of mono- or di(heterocyclic nitrogen)-substituted diarylalkanes which would be contemplated within the scope of this invention include all compounds in accordance with the following Structure II

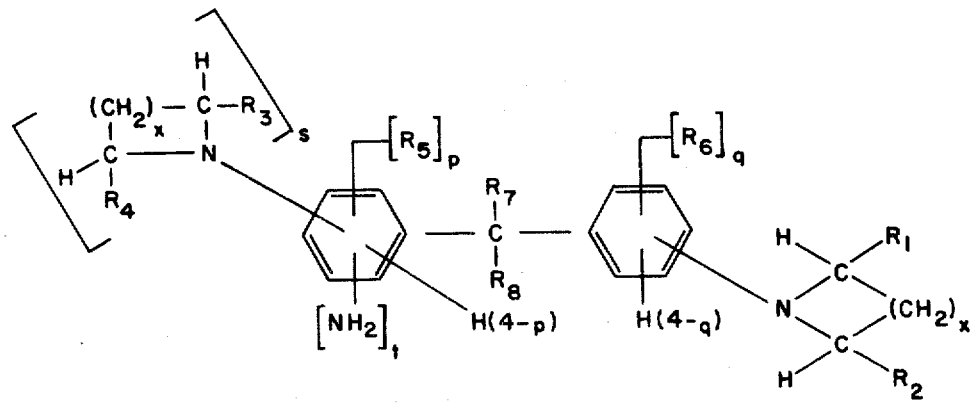

STRUCTURE II wherein $R_1$, $R_2$, $R_3$, $R_5$, $R_6$, $R_7$ and $R_8$ are selected from the group consisting of methyl or hydrogen, x is selected from the numbers 2 and 3, s is selected from the numbers 0 or 1, t is selected from the numbers 1 or 0 wherein, when s is equal to 0, t is equal to 1 and when s is equal to 1, t is equal to 0, and p and q are selected from the integers from 0 to 4.

Specific examples of the structures of the mono- or di(heterocyclic nitrogen)-substituted diarylalkanes may be exemplified by

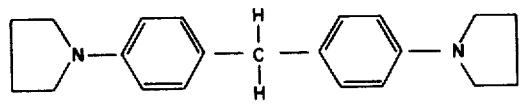

4,4'-bis(N-pyrrolidinyl)diphenylmethane

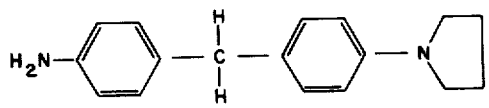

4-amino-4'-(N-pyrrolidinyl)diphenylmethane

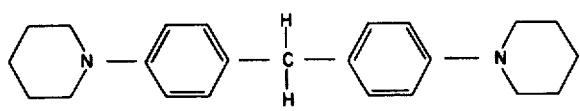

4,4'-bis(N-piperidinyl)diphenylmethane

Other suitable mono- or di(heterocyclic nitrogen)-substituted diarylalkanes would include:
4-amino-4'-(N-piperidinyl)diphenylmethane
3-amino-3'-(N-piperidinyl)diphenylmethane
2,3'-bis-(N-pyrrolidinyl)diphenylmethane
2-(N-piperidinyl)-4'-(N-pyrrolidinyl)diphenylmethane
4-amino-3-methyl-4'-(N-pyrrolidinyl)diphenylmethane
3-amino-4-methyl-4'-(N-piperidinyl)diphenylmethane
4-amino-2-methyl-4'-(N-piperidinyl)diphenylmethane
4-amino-2,3-dimethyl-4'-(N-piperidinyl)diphenylmethane
4,4'-bis-(N-piperidinyl)-2-methyldiphenylmethane
2,2-bis[4-(N-pyrrolidinyl)phenyl]propane
1-[2-(N-pyrrolidinyl)phenyl]-1-[4-(N-pyrrolidinyl)phenyl]-ethane
2-[4-aminophenyl]-2-[4-(N-pyrrolidinyl)propane]-bis[3,5-dimethyl-4-N-pyrrolidinyl)phenyl]methane In a preferred embodiment of the present invention it is contemplated that the mono- or di(heterocyclic nitrogen)-substituted diarylalkane may be prepared by cycloalkylating a primary amine with a heterocyclic oxygen compound in the presence of a catalyst selected from the group consisting of a hydrogen halide and a metal selected from Group VIII of the Periodic Table on a heterogeneous inorganic support and recovering the resultant mono- or di(heterocyclic nitrogen)-substituted diarylalkanes. The reaction is effected under a reaction condition which includes an elevated temperature in the range of from about 50° to about 300°C. and preferably in a range of from about 100° to about 200°C. In addition, another reaction condition involves pressure, said pressure ranging from about atmospheric up to about 200 atmospheres or more. When superatmospheric pressures are employed, said pressure is afforded by the introduction of a substantially inert gas such as nitrogen, helium or argon into the reaction zone, the particular pressure which is used being that which is necessary to maintain a major portion of the reactants in the liquid phase.

The catalytic composition of matter contemplated within the scope of this invention comprises a hydrogen halide or a metal selected from Group VIII of the Periodic Table on a heterogeneous inorganic support. Examples of suitable hydrogen halide catalysts would include hydrochloric acid, hydrogen fluoride, hydrogen bromide, hydrogen iodide, anhydrous hydrochloric acid, anhydrous hydrogen iodide, anhydrous hydrogen bromide, etc. Suitable examples of metals selected from Group VIII of the Periodic Table would include iron, cobalt, nickel, ruthenium, rhodium, palladium, osmium, iridium, platinum, etc. Suitable examples of heterogeneous inorganic oxide supports which may be used for the dispersal of the Group VIII metal would include alumina, silica, magnesia, thoria, zirconia, alumina-silica, alumina-magnesia, alumina-silica-magnesia, magnesia-thoria, silica-magnesia-zirconia or any mixture thereof.

In another preferred embodiment of the present invention it is found that a catalyst comprising the Group VIII metal on a heterogeneous inorganic support may be enhanced by the addition of a metal selected from Group VIB or Group VIIB of the Periodic Table. Suitable examples of metals which may be selected from Group VIB of the Periodic Table would include chromium, molybdenum and tungsten, while suitable examples of metals which may be selected from Group VIIB of the Periodic Table would include manganese and rhenium.

In yet another preferred embodiment of the present invention, it is found that the catalytic activity of the catalyst comprising a metal selected from Group VIII of the Periodic Table on an inorganic support, coupled with metals selected from Groups VIB or VIIB of the Periodic Table, if so desired, will be magnified by treatment of the heterogeneous inorganic oxide by a haliding agent. Suitable examples of haliding agents would include hydrogen chlorid, hydrogen bromide, hydrogen iodide, hydrogen fluoride and thionyl chloride.

It is understood that the aforementioned hydrogen halides, Group VIII metals, Group VIB metals, Group VIIB metals, inorganic oxide supports and haliding agents are only representative of the class of compounds which may be employed and that the present invention is not necessarily limited thereto.

Examples of suitable primary amines which may be utilized as one of the starting materials in the process of this invention include primary polyamines as in accordance with Structure III

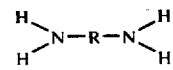

STRUCTURE III wherein R is an aryl, diaryl, diarylalkyl, or alkylaryl radical. Examples of suitable starting materials in accordance with the above promulgated structures include p-phenylenediamine, o-phenylenediamine, m-phenylenediamine, methyl-p-phenylenediamine, 2,4-diethyl-m-phenylenediamine, 1,5-naphthyldiamine, methylenedianiline, etc.

Suitable heterocyclic oxygen compounds would include but are not limited to tetrahydrofuran, 2-methyltetrahydrofuran, 2,5-dimethyltetrahydrofuran, tetrahydropyran, 2-methyltetrahydropyran, 2,6-dimethyltetrahydropyran, etc. It is understood that the aforementioned primary amines and heterocyclic oxygen compounds are only representative of the class of compounds which may be employed and are not necessarily limited thereto.

It is contemplated within the scope of this invention that the mono- or di(heterocyclic nitrogen)-substituted diarylalkanes may be prepared in either a batch or continuous type of operation as known to one skilled in the art.

The following examples are given to illustrate the process of the present invention which, however, are not intended to limit the generally broad scope of the present invention in strict accordance therewith.

EXAMPLE I

In this example 4,4-bis-(N-pyrrolidinyl)diphenylmethane was prepared by the addition of 9.9 grams of methylenedianiline to 70.6 grams of tetrahydrofuran in the presence of a catalyst comprising 1 percent iridium dispersed on an alumina support. The product was recovered, separated from the catalyst by filtration and analyzed by means of gas chromotography instrumentation which disclosed the presence of a mixture comprising 4-amino-4'-(N-pyrrolidinyl)diphenylmethane and 4,4'-bis(N-pyrrolidinyl)diphenylmethane.

The 4,4'-bis-(N-pyrrolidinyl)diphenylmethane was separated by fractional crystallization from the 4-amino-4'-(N-pyrrolidinyl)diphenylmethane, recovered and uniformly mixed with the natural rubber substrate comprising 100.0 parts per hundred natural rubber, 45.00 parts per hundred carbon, 3.10 parts per hundred zinc oxide, 3.00 parts per hundred stearic acid and 2.50 parts per hundred sulfur, in the quantity of 2.00 part per hundred rubber and said rubber substrate was aged as a result of being exposed to air. It should be noted that for the purposes of experimentation the antioxidant was present in a quantity which would not be economically feasible (greater than 300 ppm), however, the quantity of antioxidant which will be economically feasible will possess the same physical property retention as the non-feasible quantity. The basic physical properties of tensile strength, 300% modulus, and ultimate elongation were measured over a period of time comprising 7 hours and compared to a second natural rubber substrate which did not possess the di(-heterocyclic nitrogen)-substituted diarylalkane as an antioxidant. The results of the hereinbefore set forth physical properties are set forth in Tables I–III.

TABLE I

| PHYSICAL PROPERTY | DAYS | "SUBSTRATE 1 | SUBSTRATe 2 |
|---|---|---|---|
| TENSILE STRENGTH | 0 | 3433 | 3704 |
|  | 2 | 3055 | 2274 |
|  | 5 | 2203 | 1092 |
|  | 7 | 1670 | 762 | a = Substrate containing 4,4'-bis-(N-pyrrolidinyl)-diphenylmethane as an antioxidant.

It can be seen by a comparison of the relative tensile strength values that the rubber substrate possessing the antioxidant (a), retained greater tensile strength over the period of time comprising 7 days.

TABLE II

| PHYSICAL PROPERTY | DAYS | "SUBSTRATE 1 | SUBSTRATE 2 |
|---|---|---|---|
| 300% MODULUS | 0 | 1943 | 2449 |
|  | 2 | 1488 | — | a = Substrate containing 4,4'-bis-(N-pyrrolidinyl)diphenylmethane as an antioxidant.

TABLE III

| PHYSICAL PROPERTY | DAYS | "SUBSTRATE 1 | SUBSTRATE 2 |
|---|---|---|---|
| ULTIMATE ELONGATION | 0 | 480 | 410 |
|  | 2 | 370 | 267 |
|  | 5 | 263 | 163 |
|  | 7 | 220 | 135 | a = Substrate containing 4,4'-bis-(N-pyrrolidinyl)diphenylmethane as an antioxidant.

It can be seen by a comparison of the relative tensile strength values that the rubber substrate possessing the antioxidant (a) retained greater ultimate elongation over the period of time comprising 7 days.

It can be seen by a comparison of all the relative values of Tables I –III that the addition of the antioxidant comprising a di(heterocyclic nitrogen)-substituted diarylalkane, namely, 4,4'-bis-(N-pyrrolidinyl)diphenylmethane, increased the retention of physical properties for a period of time to sufficiently evaluate the novel antioxidants.

EXAMPLE II

In this example the second part of the separated mixture of Example I, 4-amino-4'-(N-pyrrolidinyl)diphenylmethane, is tested as set forth in Example I. The test also showed an increase in the physical properties comprising tensile strength, 300% modulus and ultimate elongation.

EXAMPLE III

In this example 2,2-bis[4-(N-pyrrolidinyl)phenyl]propane is prepared by the reaction of 2,2-bis(4-aminophenyl)propane with tetrahydrofuran in the presence of a hydrogen chloride-alumina catalyst. The product is recovered and separated from the catalyst by filtration and analyzed by means of gas chromatography instrumentation which discloses the product to be 2,2-bis-[4-(N-pyrrolidinyl)phenyl]propane.

The 2,2-bis-[4-(N-pyrrolidinyl)phenyl]propane is uniformly blended with an acrylonitrile-butadiene-styrene polymer rubber substrate by milling in an additive level range of from 1.0 to 4.0 parts per hundred rubber, said substrate being tested for the above set forth physical properties of Example I. The analytical tests disclosed the synthetic rubber substrate retained its physical properties for a longer retention time when the novel antioxidant was utilized.

EXAMPLE IV

In this example 2-methyl-4'-(N-piperidinyl)diphenylmethane is prepared by the addition of 2-methylmethylenedianiline to tetrahydropyran in the presence of palladium dispersed on a silica support catalyst. The product was recovered, separated from catalyst by filtration and analyzed by means of gas chromatography instrumentation which discloses the product to be 2-methyl-4'-(N-piperidinyl)diphenylmethane.

The above set forth recovered product is uniformly blended with a cross-linked polyisoprene rubber at from 1.0 to 4.0 parts per hundred of rubber. The rubber substrate is tested for the above set forth physical properties after aging for a period of 7 days, said physical properties being retained to a greater extent during the utilization of the novel antioxidant as compared to a second test of a natural rubber substrate utilizing no antioxidants.

We claim as our invention:

1. A rubber substrate containing, as an antioxidant therefor, an effective amount of a mono- or di(heterocyclic nitrogen)-substituted diarylalkane possessing the formula:

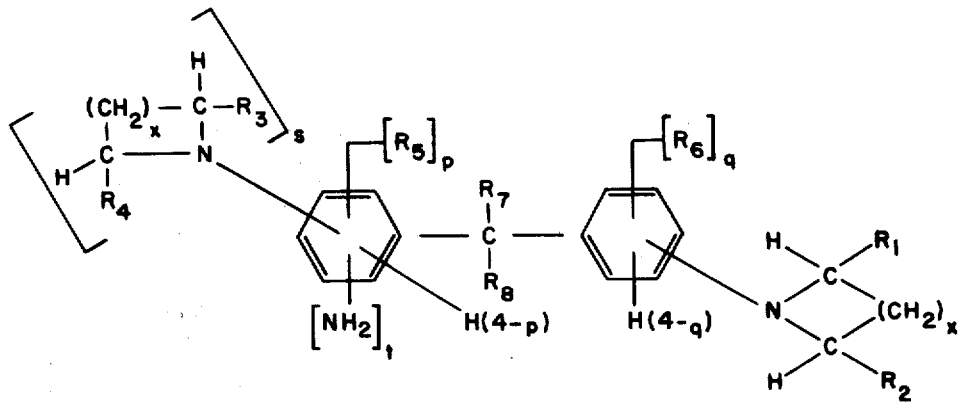

wherein $R_1$, $R_2$, $R_3$, $R_5$, $R_6$, $R_7$ and $R_8$ are selected from the group consisting of methyl or hydrogen, $x$ is selected from the numbers 2 and 3, s is selected from the numbers 0 or 1, t is selected from the numbers 1 or 0 wherein, when s is equal to 0, t is equal to 1 and when s is equal to 1, t is equal to 0, and p and q are selected from the integers from 0 to 4.

2. The mono(heterocyclic nitrogen)substituted diarylalkane of claim 1 being 4-amino-4'-(N-pyrrolidinyl)diphenylmethane.

3. The mono(heterocyclic nitrogen)-substituted diarylalkane of claim 1 being 2-methyl-4'-(N-piperidinyl)diphenylmethane.

4. The di(heterocyclic nitrogen)-substituted diarylalkane of claim 1 being 4,4'-bis-(N-pyrrolidinyl)diphenylmethane.

5. The di(heterocyclic nitrogen)-substituted diarylalkane of claim 1 being 4,4'-bis-(N-piperidinyl)diphenylmethane.

6. The di(heterocyclic nitrogen)-substituted diarylalkane of claim 1 being 2,2-bis[4-(N-pyrrolidinyl)-phenyl]propane.

7. The rubber substrate of claim 1 being natural rubber.

8. The rubber substrate of claim 1 being acrylonitrile-butadiene-styrene polymers.

9. The rubber substrate of claim 1 being polyisoprene.

10. The rubber substrate of claim 1 being cross-linked polyisoprene rubber.

* * * * *